United States Patent
Delannoy (10) Patent No.: US 10,386,859 B2
(45) Date of Patent: Aug. 20, 2019

(54) AIRCRAFT FLIGHT CONTROL METHOD AND SYSTEM

(71) Applicant: Airbus Operations SAS, Toulouse (FR)

(72) Inventor: Stéphane Delannoy, Sainte Marie (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 133 days.

(21) Appl. No.: 15/726,641

(22) Filed: Oct. 6, 2017

(65) Prior Publication Data
US 2018/0101181 A1 Apr. 12, 2018

(30) Foreign Application Priority Data
Oct. 11, 2016 (FR) ...................................... 16 59775

(51) Int. Cl.
*G05D 1/10* (2006.01)
*B64C 13/50* (2006.01)
*B64C 13/04* (2006.01)
*G05D 1/08* (2006.01)
*B64C 13/18* (2006.01)

(52) U.S. Cl.
CPC ............. *G05D 1/101* (2013.01); *B64C 13/04* (2013.01); *B64C 13/0421* (2018.01); *B64C 13/18* (2013.01); *B64C 13/503* (2013.01); *B64C 13/506* (2018.01); *G05D 1/0825* (2013.01)

(58) Field of Classification Search
None
See application file for complete search history.

(56) References Cited

U.S. PATENT DOCUMENTS

| | | | | | |
|---|---|---|---|---|---|
| 3,963,197 | A | * | 6/1976 | Oberlerchner | G05D 1/0607 244/181 |
| 4,454,496 | A | * | 6/1984 | Lowe | G01C 23/00 340/951 |
| 4,554,545 | A | * | 11/1985 | Lowe | G01C 23/00 340/951 |
| 4,569,494 | A | * | 2/1986 | Sakata | B64C 23/06 244/199.1 |

(Continued)

OTHER PUBLICATIONS

French Search Report, dated Apr. 26, 2017, priority document.

(Continued)

*Primary Examiner* — Nicholas K Wiltey
(74) *Attorney, Agent, or Firm* — Greer, Burns & Crain, Ltd.

(57) ABSTRACT

A system including a set of computation modules configured to be utilized for computation of gains of at least one piloting law relative to at least one piloting axis of the aircraft and a data capture unit for capturing in at least one computation unit associated with a given piloting axis of the aircraft first values illustrating aerodynamic coefficients of the aircraft and second values defining delay and filter characteristics of the control chain relative to the given piloting axis, the computation unit being configured to compute the gains of the piloting law utilizing at least a part of the set of computation modules and the computation unit computing inputs intended for at least one actuator of a control surface adapted to control the aircraft relative to the given piloting axis in accordance with a corresponding current control value.

13 Claims, 2 Drawing Sheets

(56) References Cited

U.S. PATENT DOCUMENTS

| | | | | |
|---|---|---|---|---|
| 5,112,009 A * | 5/1992 | Farineau | ............... | B64C 13/16 244/181 |
| 5,415,031 A * | 5/1995 | Colleu | ............... | G01C 5/005 340/977 |
| 6,164,540 A * | 12/2000 | Bridgelall | ............... | G06K 7/10851 235/455 |
| 6,325,333 B1 * | 12/2001 | Najmabadi | ............... | B64C 13/16 244/181 |
| 6,510,738 B1 * | 1/2003 | Lee | ............... | G01H 11/08 310/312 |
| 7,284,984 B1 * | 10/2007 | Zyskowski | ............... | G09B 9/08 434/28 |
| 8,014,906 B2 * | 9/2011 | Luo | ............... | G05D 1/0808 244/200 |
| 8,380,473 B2 * | 2/2013 | Falangas | ............... | G06F 17/5095 701/4 |
| 9,260,196 B2 * | 2/2016 | Oudin | ............... | B64D 43/00 |
| 9,440,747 B1 * | 9/2016 | Welsh | ............... | B64D 43/02 |
| 2003/0106958 A1 * | 6/2003 | Gold | ............... | G05D 1/0858 244/17.13 |
| 2003/0127569 A1 * | 7/2003 | Bacon | ............... | B64C 13/503 244/195 |
| 2004/0093130 A1 * | 5/2004 | Osder | ............... | B64C 27/18 701/3 |
| 2004/0267444 A1 * | 12/2004 | Coatantiec | ............... | G01C 5/005 701/533 |
| 2005/0173595 A1 * | 8/2005 | Hoh | ............... | B64C 13/04 244/223 |
| 2005/0242234 A1 * | 11/2005 | Mahmulyin | ............... | B64C 9/16 244/75.1 |
| 2007/0159392 A1 * | 7/2007 | Vallot | ............... | G01R 29/26 342/418 |
| 2007/0222285 A1 * | 9/2007 | Ribbens | ............... | B60T 8/1703 303/139 |
| 2008/0237392 A1 * | 10/2008 | Piasecki | ............... | B64C 27/26 244/6 |
| 2008/0251648 A1 * | 10/2008 | Colomer | ............... | B64C 13/16 244/76 C |
| 2008/0265104 A1 * | 10/2008 | Fabre-Raimbault | ............... | G05D 1/0623 244/76 C |
| 2009/0043432 A1 * | 2/2009 | Bazile | ............... | G05D 1/0825 701/14 |
| 2009/0125165 A1 * | 5/2009 | Delannoy | ............... | G05D 1/0825 701/3 |
| 2009/0138147 A1 * | 5/2009 | Grinits | ............... | G05D 1/0825 701/14 |
| 2009/0287365 A1 * | 11/2009 | Riedinger | ............... | G01C 23/005 701/5 |
| 2009/0314900 A1 * | 12/2009 | Puig | ............... | G05D 1/0623 244/76 C |
| 2010/0042271 A1 * | 2/2010 | Holzhausen | ............... | B64C 9/04 701/4 |
| 2011/0095136 A1 * | 4/2011 | Schwarze | ............... | B64C 9/12 244/215 |
| 2011/0168851 A1 * | 7/2011 | Cherepinsky | ............... | B64C 13/503 244/223 |
| 2011/0196514 A1 * | 8/2011 | Cao | ............... | G05B 13/048 700/50 |
| 2012/0145834 A1 * | 6/2012 | Morgan | ............... | B64C 5/02 244/90 R |
| 2012/0209457 A1 * | 8/2012 | Bushnell | ............... | G01C 21/00 701/13 |
| 2012/0248260 A1 * | 10/2012 | Krogh | ............... | G05D 1/0607 244/76 R |
| 2013/0274963 A1 * | 10/2013 | Shue | ............... | B64C 19/00 701/3 |
| 2013/0335243 A1 * | 12/2013 | Smyth, IV | ............... | G05D 1/0825 340/966 |
| 2013/0338859 A1 * | 12/2013 | Yamasaki | ............... | G05D 1/0055 701/3 |
| 2014/0236399 A1 * | 8/2014 | Oudin | ............... | G05D 1/0825 701/4 |
| 2015/0019050 A1 * | 1/2015 | Oudin | ............... | B64D 43/00 701/14 |
| 2015/0021443 A1 * | 1/2015 | Wildschek | ............... | G05D 1/0066 244/76 C |
| 2015/0028162 A1 * | 1/2015 | Wildschek | ............... | B64C 13/16 244/76 C |
| 2016/0023749 A1 * | 1/2016 | Carton | ............... | B64C 13/00 701/4 |
| 2016/0272345 A1 * | 9/2016 | Walter | ............... | B64D 45/00 |
| 2016/0304189 A1 * | 10/2016 | Carton | ............... | B64C 13/0421 |
| 2016/0320187 A1 * | 11/2016 | Higuchi | ............... | G01K 7/20 |
| 2017/0008639 A1 * | 1/2017 | Greene | ............... | B64D 45/04 |
| 2017/0323571 A1 * | 11/2017 | Lissajoux | ............... | G05D 1/0061 |
| 2019/0004081 A1 * | 1/2019 | Tremblay | ............... | G01P 13/025 |

OTHER PUBLICATIONS

"Design and Testing of a Flight Control System for Unstable Subscale Aircraft", Alejandro Sobron Rueda, Jan. 1, 2015.

"La Commande multivariable, application au pilotage d'un avion", Caroline Berard et al., Nov. 28, 2012.

"Pitch Control of Flight System using Dynamic Inversion and PID Controller", Jisha Shaji et al., Jul. 7, 2015.

"Automatic Flight Control Summary", Jan. 20, 2012.

* cited by examiner

AIRCRAFT FLIGHT CONTROL METHOD AND SYSTEM

CROSS-REFERENCES TO RELATED APPLICATIONS

This application claims the benefit of the French patent application No. 1659775 filed on Oct. 11, 2016, the entire disclosures of which are incorporated herein by way of reference.

TECHNICAL FIELD

The present invention concerns a flight control method and system for an aircraft, in particular a transport aircraft.

BACKGROUND OF THE INVENTION

It is known that modern civil aircraft are controlled by mathematical piloting laws embedded in dedicated digital computers and the inputs of which come from sensors placed on the aircraft and the outputs of which consist of control surface deflection inputs. These control surface deflection inputs are sent to controllers of actuators of these control surfaces.

The entire control chain linking movements of the aircraft and movements of the control surfaces is therefore subject to a time delay depending on the frequency of refreshing the sensors and sampling asynchronisms between the elements of the control chain and the controller of the control surface.

The piloting law is usually computed using a powerful mathematical tool and then transcribed into the computer in the form of gain tables. This method generates multiple steps before the introduction of the gains into the computer and does not enable modification of the objectives of the law in that computer.

Moreover, on a flexible aircraft, the first structural modes of which are situated at frequencies close to those of the piloting modes, it is necessary to apply frequency-domain filtering to the information from the sensors in order to limit aeroservoelastic coupling between the structure of the aircraft and the piloting law.

The mathematical model representing an entire control chain of this kind can be very complex and make the explicit writing of a corresponding piloting law in a computer impossible.

SUMMARY OF THE INVENTION

An object of the present invention is to eliminate this disadvantage. The invention concerns a method for controlling the flight of an aircraft relative to at least one piloting axis of the aircraft utilizing one or more piloting laws that can be generated and written more easily, the aircraft being provided with an electrical flight control system and either at least one control member (control column, rudder pedals, etc.) that can be actuated manually by a pilot of the aircraft at least for control relative to a piloting axis of the aircraft or at least one virtual control member adapted to be controlled by an automatic pilot type device.

According to the invention, the method includes the following steps:

an integration step comprising integrating into at least one processing unit of the flight control system of the aircraft a generic set of parameter computation modules, at least some of the computation modules being intended to be used for computation of gains of at least one piloting law relative to at least one given piloting axis, the generic set of computation modules utilizing first values illustrating aerodynamic coefficients of the aircraft and second values defining delay and filter characteristics of a control chain relative to the given piloting axis;

at least one data capture step comprising capturing, by means of a data capture unit, in at least one computation unit associated with the given piloting axis of the aircraft, first values illustrating the aerodynamic coefficients of the aircraft and second values defining the delay and filter characteristics of the control chain relative to the piloting axis, the computation unit being configured to compute the gains of the piloting law utilizing at least a part of the generic set of computation modules, the control chain being linearized so as to make it possible to generate the inputs intended for at least one actuator of a control surface adapted to control the aircraft relative to the piloting axis in accordance with at least one current control value of the aircraft, by means of a controlled variable supplied in a raw state (i.e., a non-filtered and non-delayed variable); and at least one control step comprising, during a flight of the aircraft, entering into the computation unit the current control value generated by means of a data generation unit and computing, by means of the computation unit, utilizing this current control value, the inputs for controlling the aircraft relative to the given piloting axis, the inputs computed in this way being transmitted to the actuator of the control surface.

Therefore, due to the invention, the equations of the piloting law are established from a linear representation of the (linearized) control chain, which makes it possible to generate inputs with a non-filtered and non-delayed controlled variable. Moreover, account is taken of a so-called generic set of computation modules, meaning that at least some of those computation modules (that enable computation of particular parameters) can be used to compute inputs relative to different piloting axes (pitch, yaw, roll), using for this purpose appropriate second values (entered by an operator), these second values defining delay and filter characteristics of the control chain relative to the corresponding piloting axis. The piloting law or laws utilized can be generated and written more easily than in the usual situation mentioned above.

Although not exclusively, the present invention is particularly well suited to a so-called flexible aircraft, in which the first structural modes are situated at frequencies close to those of the piloting modes, notably making it possible to implement appropriate frequency-domain filtering.

The linearized control chain advantageously satisfies the following equation:

$$\delta_u = F_{equi} \cdot \left( K_{uc} u_c + K_u u + K_{udot} s \cdot u + \frac{K_{ui}}{s}(u_c - u) \right)$$

in which:

$\delta_u$ is the movement of a control surface, generated by this control chain;

$F_{equi}$ is a global filter illustrating the modelling of a filter and all of the delays and asynchronisms of the control chain;

$u_c$ is the control value;

$u$ is the non-filtered and non-delayed controlled variable;

s is the Laplace variable; and $K_{uc}$, $K_u$, $K_{udot}$ and $K_{ui}$ are gains.

At least some of the gains $K_{uc}$, $K_u$, $K_{udot}$ and $K_{ui}$ are advantageously determined from equations present in the generic set of computation modules.

Moreover, the global filter $F_{equi}$ advantageously satisfies the following equation:

$$F_{equi} = \text{pade}(T,2) * B(s)$$

in which:

pade(T,2) is a second order Pade filter; and

B(s) is a second order Butterworth filter.

In a preferred embodiment, the generic set of parameter computation modules is utilized by a plurality of control steps to control the flight of the aircraft relative to at least two (and preferably three) of the three piloting axes of the aircraft:

the pitch axis;

the roll axis; and the yaw axis.

The present invention can therefore be applied to one of the three piloting axes of the aircraft or simultaneously to more than one of them.

In a first application, to control the flight of the aircraft at least relative to a piloting axis corresponding to the pitch axis of the aircraft, the control step advantageously comprises computing an input in the form of a deflection input $\delta q$ of an elevator of the aircraft from a current control value $Nz_c$ corresponding to a load factor Nz that represents a position of a control column that can be actuated by a pilot of the aircraft, using the following equation:

$$\delta q = F_{equi} \cdot \left( K_D N z_c + K_{Nz} N z + K_q \cdot q + \frac{K_i}{s}(Nz_c - Nz) \right)$$

in which:

$F_{equi}$ is a global filter;

s is the Laplace variable;

$K_{Nz}$, $K_q$ and $K_i$ are gains; and $K_D$ is a precontrol term.

Moreover, the gains $K_{Nz}$, $K_q$ and $K_i$ and the precontrol term $K_D$ are advantageously computed from the following equations:

$$K_{Nz} = \frac{K_u + p_\alpha K_{udot}}{A}$$

$$K_q = \frac{K_{udot}}{m_{\delta q}}$$

$$K_i = \frac{K_{ui}}{A}$$

$$K_D = \tau K_i$$

in which:

τ is a time constant value;

$m_{\delta q}$ and $p_\alpha$ are parameters obtained from flight mechanics equations;

A is a value dependent on $m_{\delta q}$ and $p_A$; and $K_{udot}$, $K_u$ and $K_{ui}$ are parameters that are computed from equations implemented in the generic set of computation modules.

Moreover, in a second application, in addition to or instead of the first application to control the flight of the aircraft at least relative to a piloting axis corresponding to the yaw axis of the aircraft, the control step advantageously comprises computing an input in the form of a deflection input δr of a virtual yaw control surface from a current control value $\beta_3$ corresponding to a sideslip angle β of the aircraft that represents the position of pedals that can be actuated by a pilot of the aircraft, using the following equation:

$$\delta r = F_{equi} \cdot \left( K_{\beta_c} \beta_c + K_\beta \beta + K_{\beta dot} \dot\beta + \frac{K_{\beta int}}{s}(\beta_c - \beta) \right)$$

in which:

$F_{equi}$ is a global filter;

s is the Laplace variable;

$K_\beta$, $K_{\beta dot}$ and $K_{\beta int}$ are gains; and $K_{\beta_c}$ is a precontrol term.

Moreover, the gains $K_\beta$, $K_{\beta dot}$ and $K_{\beta int}$ and the precontrol term $K_{\beta_c}$ are advantageously computed from equations implemented in the generic set of computation modules.

Moreover, in a third application in addition to or instead of the first and second applications to control the flight of the aircraft at least relative to a piloting axis corresponding to the roll axis of the aircraft the control step advantageously comprises computing an input in the form of a deflection input δp of a virtual roll control surface from a current control value $p_c$ corresponding to a roll rate p of the aircraft that represents a position of a control column that can be actuated by a pilot of the aircraft, using the following equation:

$$\delta p = F_{equi} \cdot \left( K_{p_c} p_c + K_p p + \frac{K_{pint}}{s}(p_c - p) \right)$$

in which:

$F_{equi}$ is a global filter;

s is the Laplace variable;

$K_p$ and $K_{pint}$ are gains; and $K_{p_c}$ is a precontrol term.

Moreover, the gains $K_p$ and $K_{pint}$ and the precontrol term $K_{p_c}$ are advantageously computed from a set of equations implemented in the generic set of computation modules.

The present invention also concerns an aircraft flight control system intended to control the flight of the aircraft relative to at least one piloting axis.

According to the invention, the system includes:

a processing unit comprising a generic set of parameter computation modules, at least some of the computation modules being intended to be used for computation of gains of at least one piloting law relative to at least one given piloting axis of the aircraft, the generic set of computation modules utilizing first values illustrating aerodynamic coefficients of the aircraft and second values defining delay and filter characteristics of a control chain relative to the given piloting axis;

at least one data capture unit configured to capture in at least one computation unit associated with a given piloting axis of the aircraft first values illustrating the aerodynamic coefficients of the aircraft and second values defining the delay and filter characteristics of the control chain relative to the piloting axis;

at least one data entry link configured to enter at least one current control value into the computation unit during a flight of the aircraft; and the at least one computation unit that is configured to compute the gains of the piloting law utilizing at least a part of the generic set of computation modules, the computation unit being configured to compute inputs intended for at least one actuator of a control surface adapted to control the aircraft relative to the piloting axis in accordance with the current control value of the aircraft using a controlled variable supplied in a raw state, the inputs computed in this way being transmitted to the actuator of the control surface.

In one particular embodiment, the system includes:
a computation unit associated with the pitch axis;
a computation unit associated with the roll axis; and
a computation unit associated with the yaw axis.

The system advantageously further includes:
at least one control member that can be actuated configured to generate a control value; and
at least one actuator of a control surface configured to actuate the control surface as a function of inputs received.

The present invention further concerns an aircraft, in particular a transport aircraft, that is provided with a system like that specified hereinabove.

BRIEF DESCRIPTION OF THE DRAWINGS

The appended figures clearly explain how the invention can be reduced to practice. In these figures, identical references designate similar elements. More specifically.

DETAILED DESCRIPTION OF THE PREFERRED EMBODIMENTS

Figure 1:
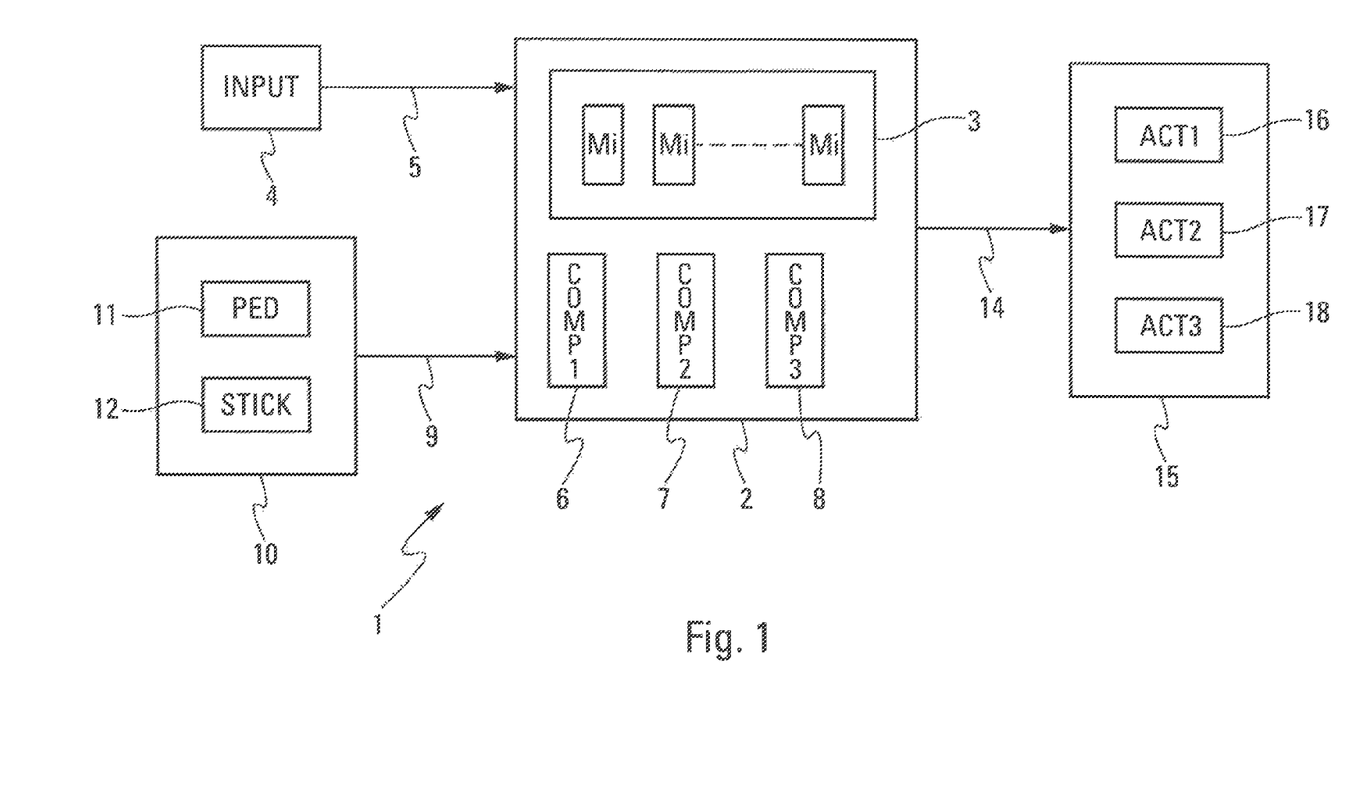
FIG. 1 is the block diagram of a flight control system and illustrates one embodiment of the invention.

The system 1 represented diagrammatically in FIG. 1 to illustrate the invention is an electrical flight control system of an aircraft, in particular a transport aircraft. This flight control system 1 is intended to control (pilot) the aircraft relative to at least one of its three piloting axes:
the pitch axis;
the yaw axis;
the roll axis.

According to the invention, the system 1 includes:
a central unit 2 including a processing unit 3 comprising a generic set of parameter computation modules Mi. At least some of the computation modules Mi are intended to be used for computation of gains of at least one piloting law relative to at least one given piloting axis of the aircraft. The generic set of computation modules Mi utilizes first values illustrating aerodynamic coefficients of the aircraft and second values defining delay and filter characteristics of a control chain relative to the given piloting axis;
at least one data capture unit 4 (INPUT (keyboard, touch screen, etc.)) connected by way of a link 5 to the central unit 2 and configured to enable an operator, notably a pilot of the aircraft, to capture in at least one computation unit 6, 7, 8 associated with a given piloting axis of the aircraft first values (illustrating the aerodynamic coefficients of the aircraft) and second values (defining the delay and filter characteristics of the control chain relative to the piloting axis);
at least one data entry link 9 connected to the central unit 2 and configured to enter into the computation unit 6, 7, 8 at least one current control value received from a data generation unit (see below) during a flight of the aircraft; and
one or more computation units 6, 7, 8 (COMP1, COMP2, COMP3, respectively, in FIG. 1).

Each computation unit 6, 7, 8 is configured to compute the gains of the associated piloting law utilizing at least a part of the generic set of computation modules Mi.

Moreover, each computation unit 6, 7, 8 is configured to compute inputs intended for at least one actuator of a control surface adapted to control the aircraft relative to the piloting axis in accordance with the current control value of the aircraft, using a controlled variable supplied in a raw state. By raw state is meant the state in which the variable is generated (or measured by an appropriate sensor), i.e., non-filtered and non-delayed.

The system 1 further includes:
the data generation unit 10 which includes at least one control member 11, 12 adapted to be actuated manually by a pilot of the aircraft and that is configured to generate a control value representing that action. The data generation unit 10 can include, as the control member, a control column 11 of the usual kind, notably a joystick (STICK), for generating a control value intended for piloting relative to the pitch or roll axis and/or pedals 12 (PED) intended for piloting relative to the yaw axis; and
at least one actuator 16, 17, and 18 of a control surface configured to actuate an appropriate control surface as a function of inputs received. The actuators 16, 17, and 18 (ACT1, ACT2 and ACT3, respectively, in FIG. 1) are represented diagrammatically in FIG. 1 in the form of a system 15 connected by a link 14 to the central unit 2 and are associated with the pitch, yaw and roll axes, respectively.

In the particular embodiment shown in FIG. 1, the system 1 includes simultaneously:
the computation unit 6 that is associated with the pitch axis;
the computation unit 7 that is associated with the yaw axis; and
the computation unit 8 that is associated with the roll axis.

These computation units 6, 7 and 8 can be part of one and the same computation element.

The inputs computed by each of the computation units 6, 7 and 8 are transmitted to one or more actuators of a respective appropriate (real or virtual) control surface via the link 14.

The set of computation modules Mi is termed generic because computation modules Mi of this set can be utilized by each of the three computation units 6, 7 and 8.

Moreover, the system 1 is generic. It is, in fact, suited to any aircraft (see below). The code determined as described above (which is installed in the central unit 2) is directly usable for any aircraft without modification (provided the system architecture of the aircraft allows embedding of this code).

The system 1 therefore applies to piloting relative to the pitch, roll and/or yaw axes of an aircraft that is equipped with control surfaces enabling movement of this aircraft relative to these three axes.

The definition of the various computation elements utilized in the central unit 2 can be explained on the basis of two successive phases, respectively comprising:
establishing a particular representation, of optimized complexity, of the (closed loop) control chain; and on the basis of that modelling, defining a piloting law the objectives of which are then explicitly apparent and the equations of which compute the inputs of the law in real time. These equations can then be directly coded in the central unit 2 of the flight control system 1.

To implement these two phases the following aircraft model is utilized.

The aircraft, without considering the flexible modes or the digital control system, can be represented by the usual flight mechanics differential equations for the pitch axis or for the coupled roll and yaw axes.

In the case of the pitch axis, these equations are written:

$$\begin{bmatrix} \dot{\alpha} \\ \dot{q} \end{bmatrix} = \begin{bmatrix} p_\alpha & 1 \\ m_\alpha & m_q \end{bmatrix} \cdot \begin{bmatrix} \alpha \\ q \end{bmatrix} + \begin{bmatrix} 0 \\ m_{\delta q} \end{bmatrix} \cdot \delta_q$$

where $\alpha$ is the angle of attack, q is the pitch rate and $\delta_q$ is the deflection of the elevator.

The vertical load factor $N_z$ is computed as follows:

$$Nz = \frac{V}{g}\frac{\pi}{180}(q-\dot{\alpha}) = -\frac{V}{g}\frac{\pi}{180}p_\alpha\alpha = -\frac{V}{g}\frac{\pi}{180}\frac{p_\alpha}{s-p_\alpha}q$$

Using the Laplace variable, we obtain:

$$(s^2 - (p_\alpha + m_q)s + m_q p_\alpha - m_\alpha)Nz = -\frac{V}{g}\frac{\pi}{180}p_\alpha p_{\delta q}\delta q \quad \text{(i)}$$

In the case of the roll and yaw axes, these equations are written in the usual way:

$$\begin{bmatrix} \dot{\beta} \\ \dot{r} \\ \dot{p} \\ \dot{\varphi} \end{bmatrix} = \begin{bmatrix} \frac{Y_\beta}{V} & -\cos\alpha & \sin\alpha & 0 \\ n_\beta & n_r & n_p & 0 \\ l_\beta & l_r & l_p & 0 \\ 0 & \tan\theta & 1 & 0 \end{bmatrix} \begin{bmatrix} \beta \\ r \\ p \\ \varphi \end{bmatrix} + \begin{bmatrix} 0 & 0 \\ n_{\delta l} & n_{\delta n} \\ l_{\delta l} & l_{\delta n} \\ 0 & 0 \end{bmatrix} \begin{bmatrix} \delta l \\ \delta n \end{bmatrix}$$

where $\beta$ is the sideslip angle, r is the yaw rate, p is the roll rate, $\varphi$ is the roll angle, $\delta l$ is the deflection of the main roll control surface, $\delta n$ is the deflection of the main yaw control surface, $\alpha$ is the angle of attack, and $\theta$ is the longitudinal pitch angle.

The values of $\alpha$ and $\theta$ are considered sufficiently small to simplify the sine, cosine and tangent terms. The model commonly used is then:

$$\begin{bmatrix} \dot{\beta} \\ \dot{r} \\ \dot{p} \\ \dot{\varphi} \end{bmatrix} = \begin{bmatrix} \frac{Y_\beta}{V} & -1 & 0 & 0 \\ n_\beta & n_r & n_p & 0 \\ l_\beta & l_r & l_p & 0 \\ 0 & 0 & 1 & 0 \end{bmatrix} \begin{bmatrix} \beta \\ r \\ p \\ \varphi \end{bmatrix} + \begin{bmatrix} 0 & 0 \\ n_{\delta l} & n_{\delta n} \\ l_{\delta l} & l_{\delta n} \\ 0 & 0 \end{bmatrix} \begin{bmatrix} \delta l \\ \delta n \end{bmatrix}$$

If the terms in $n_p$, $l_\beta$ and $l_r$ can be ignored, or if a first piloting law enables compensation thereof, the model then becomes:

$$\begin{bmatrix} \dot{\beta} \\ \dot{r} \\ \dot{p} \\ \dot{\varphi} \end{bmatrix} = \begin{bmatrix} \frac{Y_\beta}{V} & -1 & 0 & 0 \\ n_\beta & n_r & 0 & 0 \\ 0 & 0 & l_p & 0 \\ 0 & 0 & 1 & 0 \end{bmatrix} \begin{bmatrix} \beta \\ r \\ p \\ \varphi \end{bmatrix} + \begin{bmatrix} 0 & 0 \\ n_{\delta l} & n_{\delta n} \\ l_{\delta l} & l_{\delta n} \\ 0 & 0 \end{bmatrix} \begin{bmatrix} \delta l \\ \delta n \end{bmatrix}$$

Adopting the notation:

$$B = \begin{bmatrix} n_{\delta l} & n_{\delta n} \\ l_{\delta l} & l_{\delta n} \end{bmatrix} \text{ and } \begin{bmatrix} \delta l \\ \delta n \end{bmatrix} = B^{-1} \begin{bmatrix} \delta r \\ \delta p \end{bmatrix} \quad \text{(ii)}$$

we obtain:

$$\left(s^2 - \left(n_r + \frac{Y_\beta}{V}\right)s + \left(n_\beta + n_r\frac{Y_\beta}{V}\right)\right)\beta = -\delta_r \quad \text{(iii)}$$

and:

$$(s-l_p)p = \delta_p \quad \text{(iv)}$$

As indicated above, a linearized global control chain is considered, i.e., a system without saturation or parameter thresholds. In mathematical terms this linearized control chain comprises mutually commutative elements. The delays linked to the various steps of this control chain can therefore be grouped into one and the same term.

Consequently, if all the delays and asynchronisms of the control chain are related by an identity function, an equivalent single delay corresponding to the sum of all the delays can be assumed to apply in the final position of the control chain. Likewise, the structural filtering applied to the inputs of the piloting law can in an equivalent manner be placed downstream of the law, on the final inputs.

Figure 2:
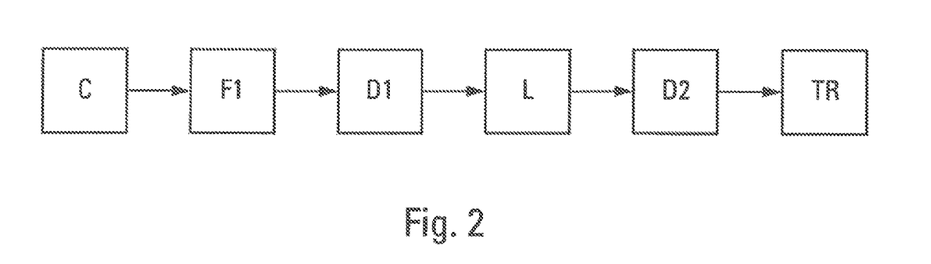
FIGS. 2 to 4 are diagrammatic representations of a control chain.

The usual representation of the control chain is shown in more detail in FIG. 2.

In FIG. 2:
C represents the set of sensors;
F1 represents a first structural filter;
D1 represents a first delay;
L represents the piloting law;
D2 represents a second delay; and
TR represents the transfer function of the actuator.

Figure 3:
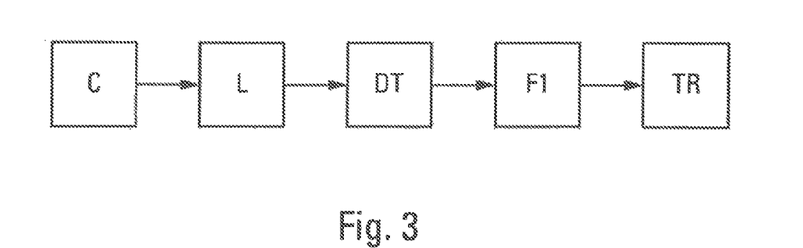

The control chain can be represented in an equivalent manner, as in FIG. 3, in which DT represents a total delay corresponding to the accumulated delays D1 and D2 of the FIG. 2 control chain.

Figure 4:
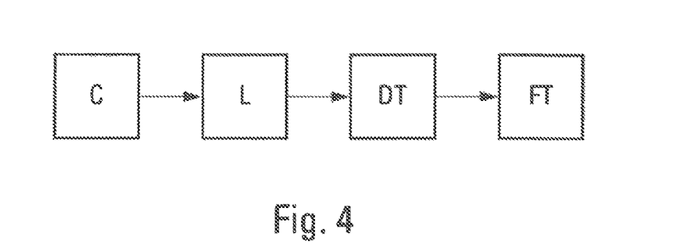

Moreover, the representation shown in FIG. 4 is obtained by combining the structural filter F1 and the transfer function TR of the actuator as a filter FT illustrating total filtering.

The entire control chain can therefore be considered as a law L applied to non-filtered and non-delayed sensors C the inputs from which pass through a delay unit DT and a single filter FT.

A generalized form of a PID (proportional-integral-derivative) type piloting law is written:

$$L = \left(K_{uc}u_c + K_u u + K_{udot}s \cdot u + \frac{K_{ui}}{s}(u_c - u)\right)$$

where $u_c$ is the setpoint of the law (or control value) and u is the controlled variable, considered non-filtered and non-delayed, i.e., in its raw state.

The control chain corresponding to the FIG. 4 representation is then written:

$$\delta_u = delay_{global}(s) * \text{Filter}(s)\left(K_{uc}u_c + K_u u + K_{udot}su + \frac{K_{ui}}{s}(u_c - u)\right) \quad \text{(v)}$$

$\delta_u$ is the control surface movement (deflection) generated by this control chain.

The definition of the various computation elements for obtaining the final piloting law can therefore be explained on the basis of two successive phases. The first phase, based on the equation (v) of the control chain, comprises establishing an equivalent representation of that chain and the second phase utilizes that new representation to establish the equations of the piloting law.

Where the first phase is concerned, FILT(s)= $delay_{global}$(s)*Filter(s) is modelled in the form of a single global filter of order N (N≥1) denoted $F_{equi}$(s) and enables FILT(s) to be represented with great fidelity in a pass-band corresponding to that of the piloting law.

A preferred formulation enabling the filter and delay characteristics of the control chain to be represented with great fidelity and simplicity is as follows:

$$F_{equi}(s) = \text{pade}(T,2) * B(s)$$

where pade(T,2) is a second order Pade filter, with time constant T:

$$\text{pade}(T, 2) = \frac{\frac{T^2}{12}s^2 - \frac{T}{2}s + 1}{\frac{T^2}{12}s^2 + \frac{T}{2}s + 1}$$

and B(s) is a second order Butterworth filter of angular frequency $\omega_0$ and and damping $\xi$:

$$B(s) = \frac{1}{\frac{s^2}{\omega_0^2} + 2\xi\frac{s}{\omega_0} + 1}$$

The pade(T,2) filter is well known to represent mathematically the effect on a control chain of a delay T.

Moreover, with a second order filter, the structure of the filter B(s) enables a good representation of the low-pass characteristic of a filter whilst also representing very well its Q (overvoltage factor).

A fourth order global filter $F_{equi}(s)$ is therefore chosen (the fourth order corresponding to the sum of the second order of the pade(T,2) filter and the second order of the B(s) filter) to represent faithfully, at the piloting frequencies of the aircraft, the low-pass filter and overvoltage factor characteristics given by B(s) and the chain delay characteristics given by T.

We obtain $$\delta_u = \frac{\frac{T^2}{12}s^2 - \frac{T}{2}s + 1}{\frac{T^2}{12}s^2 + \frac{T}{2}s + 1} \cdot \frac{1}{\frac{s^2}{\omega_0^2} + 2\xi\frac{s}{\omega_0} + 1} \quad \text{(vi)}$$

-continued $$\left(K_{uc}u_c + K_u u + K_{udot}su + \frac{K_{ui}}{s}(u_c - u)\right)$$

Moreover, concerning the aforementioned second phase, if the pitch or yaw axes are considered, the system representing the aircraft is a second order system (equations (i) and (iii)). On the other hand, if the roll axis is considered, the system representing the aircraft is a first order system (equation (iv)), which is a special case of a second order system, the second order coefficient of which is zero.

The second order general differential equation (enabling representation of the aircraft on each of the axes) of a state variable system u is then considered, where the deflection of the control surface is $\delta_u$:

$$(K_2 s^2 + K_1 s + K_0)u = \delta_u \quad \text{(vii)}$$

The piloting law is defined by rewriting (vi) with more general notation:

$$\delta_u = \quad \text{(viii)}$$

$$\frac{\theta_2 s^2 - \theta_1 s + \theta_0}{\theta_2 s^2 + \theta_1 s + \theta_0} \cdot \frac{1}{as^2 + bs + d}\left(K_{uc}u_c + K_u u + K_{udot}su + \frac{K_{ui}}{s}(u_c - u)\right)$$

The differential equation (vii) then becomes:

$$(\theta_2 s^2 + \theta_1 s + \theta_0)(as^2 + bs + d)(K_2 s^2 + K_1 s + K_0)u =$$

$$(\theta_2 s^2 - \theta_1 s + \theta_0)\left(K_{uc}u_c + K_u u + K_{udot}su + \frac{K_{ui}}{s}(u_c - u)\right)$$

The piloting law therefore includes:
a precontrol gain $K_{uc}$ applied to the control value $u_c$;
a direct feedback on u, denoted $K_u$;
a feedback on the derivative of u, denoted $K_{udot}$; and
an integral feedback denoted $K_{ui}$, applied to ($u_c$-u).
The closed loop system is then:

$$(T_7 s^7 + T_6 s^6 + T_5 s^5 + (T_4 - \theta_2 K_{udot})s^4 + (T_3 - \theta_2 K_u \theta_1 K_{udot})$$
$$s^3 + (T_2 + \theta_2 K_{ui} + \theta_1 K_u - \theta_0 K_{udot})s^2 + (T_1 - \theta_1 K_{ui} -$$
$$\theta_0 K_u)s + \theta_0 K_{ui})u = (\theta_2 s^2 - \theta_1 s + \theta_0)(K_{uc} s + K_{ui})u_c \quad \text{(ix)}$$

the terms of which are computed via a function coefequationBF such that:

$$[T_1, T_2, T_3, T_4, T_5, T_6, T_7, \theta_0, \theta_1, \theta_2] = \text{coefequation}BF(a, b, d, T, K_0, K_1, K_2)$$

By way of illustration, the following equations are considered in this case:

$$\theta_2 = \frac{T^2}{12}$$

$$\theta_1 = \frac{T}{2}$$

$$\theta_0 = 1.0$$

$$T_7 = a\theta_2 K_2$$

$$T_6 = a\theta_2 K_1 + (b\theta_2 + a\theta_1)K_2$$

$$T_5 = a\theta_2 K_0 + (b\theta_2 + a\theta_1)K_1 + (d\theta_2 + b\theta_1 + a\theta_0)K_2$$

$$T_4 = (b\theta_2 + a\theta_1)K_0 + (d\theta_2 + b\theta_1 + a\theta_0)K_1 + (d\theta_1 + b\theta_0)K_2$$

$$T_3 = (d\theta_2 + b\theta_1 + a\theta_0)K_0 + (d\theta_1 + b\theta_0)K_1 + d\theta_0 K_2$$

-continued
$$T_2 = (d\theta_1 + b\theta_0)K_0 + d\theta_0 K_1$$
$$T_1 = d\theta_0 K_0$$

The system described by the equation (ix) has seven poles, which are defined as the roots of the seventh order polynomial corresponding to the left-hand part of the equation (ix).

The PID type law does not have sufficient degrees of freedom to place the seven poles of the system. It enables only three of them to be constrained.

Three poles of the system are therefore placed by the law on the objectives of the law and are therefore the roots of the polynomial:

$$(s^2 + 2\varepsilon\omega s + \omega^2)\left(s + \frac{1}{\tau}\right) = \mu_3 s^3 + \mu_2 s^2 + \mu_1 s + \mu_0$$

where $\omega$ and $\xi$ are the angular frequency and damping objectives of the complex mode, and $\tau$ is the time constant objective of the real mode.

In a closed loop the last four poles become values that are not objectives but consequences of the law. These four poles are the roots of a polynomial.

The set of closed loop poles therefore defines the polynomial of the closed loop system:

$$(x_4 s^4 + x_3 s^3 + x_2 s^2 + x_1 s + x_0) \cdot (\mu_3 s^3 + \mu_2 s^2 + \mu_1 s + \mu_0) \cdot u \qquad (x)$$

The left-hand part of the equation (ix) and the equation (x) can therefore be related via an identity function.

This identity function is performed via a cascade of equations, defined in a function equation_law_input, such that:

$$[K_u, K_{ui}, K_{udot}] = \text{equation\_law\_input}(\mu_0, \mu_1, \mu_3, T_1, T_2, T_3, T_4, T_5, T_6, T_7, \theta_0, \theta_1, \theta_2)$$

The three unknowns $K_u$, $K_{ui}$ and $K_{udot}$ are defined by a system of three equations:

$$K_{11} K_u + K_{12} K_{udot} + K_{13} K_{ui} = D_{11}$$
$$K_{21} K_u + K_{22} K_{udot} + K_{23} K_{ui} = D_{22}$$
$$K_{31} K_u + K_{32} K_{udot} + K_{33} K_{ui} = D_{33}$$

In this system, the determinants are:

$$D = K_{11}\begin{vmatrix} K_{22} & K_{23} \\ K_{32} & K_{33} \end{vmatrix} - K_{21}\begin{vmatrix} K_{12} & K_{13} \\ K_{32} & K_{33} \end{vmatrix} + K_{31}\begin{vmatrix} K_{12} & K_{13} \\ K_{22} & K_{23} \end{vmatrix}$$

$$Rq = D_{11}\begin{vmatrix} K_{22} & K_{23} \\ K_{32} & K_{33} \end{vmatrix} - D_{22}\begin{vmatrix} K_{12} & K_{13} \\ K_{32} & K_{33} \end{vmatrix} + D_{33}\begin{vmatrix} K_{12} & K_{13} \\ K_{22} & K_{23} \end{vmatrix}$$

$$Rz = K_{11}\begin{vmatrix} D_{22} & K_{23} \\ D_{33} & K_{33} \end{vmatrix} - K_{21}\begin{vmatrix} D_{11} & K_{13} \\ D_{33} & K_{33} \end{vmatrix} + K_{31}\begin{vmatrix} D_{11} & K_{13} \\ D_{22} & K_{23} \end{vmatrix}$$

$$Ri = K_{11}\begin{vmatrix} K_{22} & D_{22} \\ K_{32} & D_{33} \end{vmatrix} - K_{21}\begin{vmatrix} K_{12} & D_{11} \\ K_{32} & D_{33} \end{vmatrix} + K_{31}\begin{vmatrix} K_{12} & D_{11} \\ K_{22} & D_{22} \end{vmatrix}$$

D is not zero if it is assumed that the system is controllable.

We finally obtain:

$$K_u = \frac{R_q}{D}$$

-continued
$$K_{udot} = \frac{R_z}{D}$$
$$K_{ui} = \frac{R_i}{D}$$

In these expressions, the following formulas are used:

$$x_4 = \frac{T_7}{\mu_3}$$
$$x_3 = \frac{T_6 - x_4 \mu_2}{\mu_3}$$
$$x_2 = \frac{T_5 - (x_4 \mu_1 + x_3 \mu_2)}{\mu_3}$$
$$C_1 = \frac{T_4 - (x_4 \mu_0 + x_3 \mu_1 + x_2 \mu_2)}{\mu_3}$$
$$C_2 = \frac{T_3 - x_3 \mu_0 - x_2 \mu_1}{\mu_3}$$
$$C_3 = C_2 - \frac{\mu_2 C_1}{\mu_3}$$
$$K_{11} = \theta_1 + \frac{\mu_2 \theta_2}{\mu_3}$$
$$K_{12} = \frac{\mu_1 \theta_2}{\mu_3} - \theta_0 - \frac{\mu_2\left(\theta_1 + \frac{\mu_2}{\mu_3}\theta_2\right)}{\mu_3}$$
$$K_{13} = \theta_2$$
$$D_{11} = x_2 \mu_0 + \mu_1 C_1 + \mu_2 C_3 - T_2$$
$$K_{21} = \theta_0 - \frac{\mu_1 \theta_2}{\mu_3}$$
$$K_{22} = \frac{\mu_1\left(\theta_1 + \frac{\mu_2 \theta_2}{\mu_3}\right) - \mu_0 \theta_2}{\mu_3}$$
$$K_{23} = \theta_1$$
$$D_{22} = T_1 - \mu_0 C_1 - \mu_1 C_3$$
$$K_{31} = \frac{-\mu_0 \theta_2}{\mu_3}$$
$$K_{32} = \frac{\mu_0\left(\theta_1 + \frac{\mu_2 \theta_2}{\mu_3}\right)}{\mu_3}$$
$$K_{33} = -\theta_0$$
$$D_{33} = -\mu_0 C_3$$

This piloting law can then be applied to the pitch, yaw or roll axes of an aircraft, the equation (vii) and the equations (i), (iii) or (iv) being related by an identity function. The control chain (vi) of the aircraft and the equation (viii) are related by an identity function.

In a first application, to control the aircraft relative to its pitch axis, the computation unit 6 (FIG. 1) is configured to compute an input in the form of a deflection input 5q of an elevator of the aircraft on the basis of a current control value $Nz_c$ (corresponding to a load factor Nz) that represents the position of the control column 11 that can be pivoted toward the front or toward the rear by the pilot of the aircraft.

The computation unit 6 computes the deflection input δq using the following equation:

$$\delta q = F_{equi} \cdot \left( K_D Nz_c + K_{Nz} Nz + K_q \cdot q + \frac{K_i}{s}(Nz_c - Nz) \right)$$

that is to say:

$$\delta q = \frac{\frac{T^2}{12}s^2 - \frac{T}{2}s + 1}{\frac{T^2}{12}s^2 + \frac{T}{2}s + 1} \cdot \frac{1}{as^2 + bs + 1} \cdot \left( K_D Nz_c + K_{Nz} Nz + K_q q + \frac{K_i}{s}(Nz_c - Nz) \right)$$

This equation is obtained by rewriting the equation (vi) with the names of variables corresponding to the equation (i).

Using the notation:

$$= -\frac{V}{g}\frac{\pi}{180} p_\alpha m_{\delta q}, \; K_0 = m_q p_\alpha - m_\alpha, \; K_1 = -(p_\alpha + m_q), \; K_2 = 1.0$$

we obtain:

$$[T_1, T_2, T_3, T_4, T_5, T_6, T_7, \theta_0, \theta_1, \theta_2] = \text{coefequation}BF(a,b,d,T,K_0,K_1,K_2)$$

The objectives of the law, which can be selected, are:
ω the required value of the angular frequency of the attack oscillation;
ξ the required value of the damping of the attack oscillation; and
τ the required value of the time constant of the real mode linked to the presence of an integrator.

We then write:

$$\mu_3 = 1.0$$
$$\mu_2 = 2\zeta\omega + \frac{1}{\tau}$$
$$\mu_1 = \omega^2 + \frac{2\zeta\omega}{\tau}$$
$$\mu_0 = \frac{\omega^2}{\tau}$$

We obtain:

$$[K_u, K_{ui}, K_{udot}] = \text{equation\_law\_input}(\mu_0, \mu_1, \mu_2, \mu_3, T_1, T_2, T_3, T_4, T_5, T_6, T_7, \theta_0, \theta_1, \theta_2)$$

and $$K_{Nz} = \frac{K_u + p_\alpha K_{udot}}{A}$$

$$K_q = \frac{K_{udot}}{m_{\delta q}}$$

$$K_i = \frac{K_{ui}}{A}$$

The precontrol term $K_D$ enables compensation of the real mode:

$$K_D = \tau K_i$$

Moreover, in a second application, to control the aircraft relative to its yaw axis, the computation unit 7 (FIG. 1) is configured to compute an input in the form of a deflection input δr of a virtual yaw control surface, on the basis of a current control value $\beta_c$ (corresponding to a sideslip angle β of the aircraft), which represents the position of the pedals 12 that can be actuated by the pilot of the aircraft.

The computation unit 7 computes the deflection input δr using the following equation:

$$\delta r = F_{equi} \cdot \left( K_{\beta_c} \beta_c + K_\beta \beta + K_{\beta dot} \dot\beta + \frac{K_{\beta int}}{s}(\beta_c - \beta) \right)$$

that is to say:

$$\delta r = \frac{\frac{T^2}{12}s^2 - \frac{T}{2}s + 1}{\frac{T^2}{12}s^2 + \frac{T}{2}s + 1} \cdot \frac{1}{as^2 + bs + 1} \cdot \left( K_{\beta_c} \beta_c + K_\beta \beta + K_{\beta dot} \dot\beta + \frac{K_{\beta int}}{s}(\beta_c - \beta) \right)$$

This equation is obtained by rewriting the equation (vi) with the names of variables corresponding to the equation (iii).

Using the notation:

$$K_2 = 1.0, \; K_1 = -\left(\frac{Y_\beta}{V} + n_r\right), \; K_0 = n_\beta + n_r \frac{Y_\beta}{V}$$

we obtain:

$$[T_1, T_2, T_3, T_4, T_5, T_6, T_7, \theta_0, \theta_1, \theta_2] = \text{coefequation}BF(a,b,d,T,K_0,K_1,K_2)$$

The objectives of the law, which can be selected, are:
$\omega_\beta$ the required value of the angular frequency of the Dutch roll mode;
$\xi_\beta$ the required damping value of the Dutch roll mode;
$\tau_{\beta int}$ the required value of the time constant of the real mode linked to the presence of an integrator.

We then write:

$$\mu_3 = 1.0, \; \mu_2 = 2\xi_\beta \omega_\beta + \frac{1}{\tau_{\beta int}}, \; \mu_1 = \omega_\beta^2 + \frac{2\xi_\beta \omega_\beta}{\tau_{\beta int}}, \; \mu_0 = \frac{\omega_\beta^2}{\tau_{\beta int}}$$

We obtain:

$$[K_\beta, K_{\beta}, K_{\beta dot}] = \text{equation\_law\_input}(\mu_0, \mu_1, \mu_2, \mu_3, T_1, T_2, T_3, T_4, T_5, T_6, T_7, \theta_0, \theta_1, \theta_2)$$

The precontrol term $K_{\beta_c}$ enables compensation of the real mode:

$$K_{\beta_c} = \tau_{\beta int} \cdot K_{\beta int}$$

Moreover, in a third application, to control the aircraft relative to its roll axis, the computation unit 8 (FIG. 1) is configured to compute an input in the form of a deflection input δp of a virtual roll control surface on the basis of a current control value $p_c$ (corresponding to a rate of roll p of the aircraft) that represents the position of the control column 11 that can be pivoted toward the right and toward the left by the pilot of the aircraft.

The computation unit 8 computes the deflection input δp using the following equation:

$$\delta p = F_{equi} \cdot \left(K_{p_c} p_c + K_p p + \frac{K_{pint}}{s}(p_c - p)\right)$$

that is to say:

$$\delta p = \frac{\frac{T^2}{12}s^2 - \frac{T}{2}s + 1}{\frac{T^2}{12}s^2 + \frac{T}{2}s + 1} \cdot \frac{1}{as^2 + bs + 1} \cdot \left(K_{p_c} p_c + K_p p + \frac{K_{pint}}{s}(p_c - p)\right)$$

This equation is obtained by rewriting the equation (vi) with the names of variables corresponding to the equation (iv).

Using the notation: $K_2 = 0.0$, $K_1 = 1.0$, $K_0 = -l_p$
we obtain:

$$[T_1, T_2, T_3, T_4, T_5, T_6, T_7, \theta_0, \theta_1, \theta_2] = \text{coefequation}_{BF}(a, b, d, T, K_0, K_1, K_2)$$

The objectives of the law, which can be selected, are:
$T_{rp}$ the required value of the time constant of the real mode corresponding to the pure roll mode of the aircraft;
$T_{sp}$ the required value of the time constant of the real mode corresponding to the spiral mode of the aircraft.
We then write:

$$\mu_2 = 1.0, \quad \mu_1 = \frac{T_{rp} + T_{sp}}{T_{rp} T_{sp}}, \quad \mu_0 = \frac{1}{T_{rp} T_{sp}}$$

Because the law to be defined is of lower order, instead of the subfunction equation_law_input a slightly different subfunction equation_law_input is defined:

$$[K_u, K_{ui}] = \text{equation\_law\_input}(\mu_0, \mu_1, \mu_2, T_1, T_2, T_3, T_4, T_5, T_6, \theta_0, \theta_1, \theta_2)$$

Ku and Kui are the solutions of a system of two equations:

$$K_u = \frac{D_{11} K_{22} - D_{22} K_{12}}{\det D} \quad K_{ui} = \frac{K_{11} D_{22} - K_{21} D_{11}}{\det D}$$

The following equations are used for these equations:

$$x_4 = \frac{T_6}{\mu_2}$$

$$x_3 = \frac{T_5 - x_4 \mu_1}{\mu_2}$$

$$C_1 = \frac{T_4 - (x_4 \mu_0 + x_3 \mu_1)}{\mu_2}$$

$$C_2 = \frac{T_3 - x_3 \mu_0}{\mu_2}$$

$$C_3 = C_2 - \frac{\mu_1 c_1}{\mu_2}$$

$$C_4 = \frac{T_2 - (\mu_0 c_1 + \mu_1 c_3)}{\mu_2}$$

$$K_{11} = \theta_0 - \frac{\mu_0 \theta_2}{\mu_2} + \frac{\mu_1(\theta_1 + \mu_1 \theta_2)}{\mu_2}$$

$$K_{12} = \theta_1 + \frac{\mu_1 \theta_2}{\mu_2}$$

-continued $$D_{11} = T_1 - \mu_0 C_3 - \mu_1 C_4$$

$$K_{21} = \frac{\theta_1 + \mu_1 \theta_2}{\mu_2}$$

$$K_{22} = -\theta_0$$

$$D_{22} = -\mu_0 C_4$$

$$\det D = K_{11} K_{22} - K_{12} K_{21}$$

We obtain:

$$K_p = K_u$$

$$K_{pint} = K_{ui}$$

The precontrol term $K_{p_c}$ enables compensation of the real mode $T_{sp}$:

$$K_{pc} = T_{sp} \cdot K_{pint}$$

Figure 5:
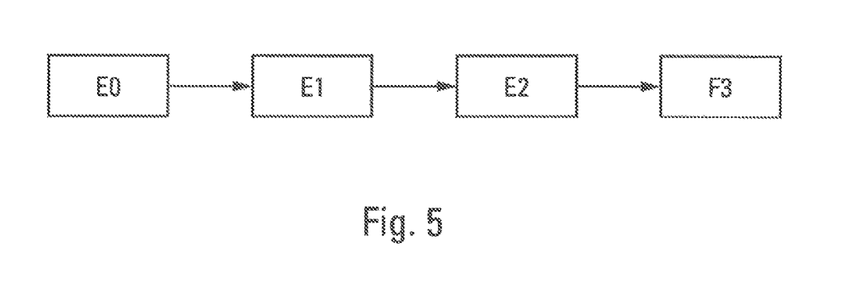
FIG. 5 shows the steps of a method implemented by a flight control system.

The installation and operation of the flight control system 1 as described above can be effected using a sequence of steps E1 to E3 shown in FIG. 5.

This sequence of steps comprises:
an integration step E1 comprising integrating (i.e., coding) the generic set of computation modules Mi in the processing unit 3 of the flight control system 1. This generic set of computation modules Mi has been determined in a previous step E0, notably employing the above two phases;
at least one data capture step E2 comprising capturing by means of the data capture unit 4 in at least one of the computation units 6, 7, 8 and preferably in the three computation units 6, 7, 8 first values illustrating the aerodynamic coefficients of the aircraft and second values defining the delay and filter characteristics of the control chain relative to the corresponding piloting axis; and
a control (or piloting) step E3 comprising, during a flight of the aircraft, entering into the computation unit or units 6, 7 and 8 the current control value or values generated by means of the data generation unit 10 and computing the inputs for controlling the aircraft relative to the piloting axis or axes concerned by means of the computation unit or units 6, 7 and 8 using this/these current control value or values.

Consequently, the invention comprises coding equations which, utilized in cascade, enable real time computation of the gains of a piloting law embedded in a computer (central unit 2) of an aircraft. The system 1 is applied to piloting relative to the pitch, roll and/or yaw axes of any aircraft provided with control surfaces enabling maneuvering of the aircraft about those axes.

For reducing the invention to practice:
the aerodynamic coefficients of the aircraft being known, the delay characteristics of the control chain being known, and the various filters of the control chain being known (sensor acquisition filters, structural filters, actuator transfer functions), the parameters T, $\omega_0$ and $\xi$ and T, $\omega_0$ and $\xi$ of the equation (vi) can be assigned values;
the objectives of placement of the piloting law are then freely defined; and
the solution can then be applied to piloting the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling the flight of an aircraft with respect to at least one piloting axis of the aircraft, said aircraft being provided with an electrical flight control system, comprising the following steps:
integrating into at least one processing unit of the flight control system of the aircraft a generic set of parameter computation modules in an integration step, at least some of said computation modules being intended to be used for computation of gains of at least one piloting law relative to at least one given piloting axis, said generic set of computation modules utilizing first values illustrating aerodynamic coefficients of the aircraft and second values defining delay and filter characteristics of a control chain relative to the given piloting axis;
capturing by means of a data capture unit in at least one computation unit associated with the given piloting axis of the aircraft, in at least one data capture step, first values illustrating the aerodynamic coefficients of the aircraft and second values defining the delay and filter characteristics of the control chain relative to said piloting axis, said computation unit being configured to compute the gains of the piloting law utilizing at least a part of said generic set of computation modules, the control chain being linearized so as to make it possible to generate inputs intended for at least one actuator of a control surface adapted to control the aircraft relative to said piloting axis in accordance with at least one current control value of the aircraft by means of a controlled variable supplied in a raw state, the control chain being linearized and verifying the following equation:

$$\delta_u = F_{equi} \cdot \left( K_{uc} u_c + K_u u + K_{udot} s \cdot u + \frac{K_{ui}}{s}(u_c - u) \right)$$

in which:
$\delta_u$ is the movement of a control surface generated by this control chain;
$F_{equi}$ is a global filter illustrating the modelling of a filter and all of the delays and asynchronisms of the control chain and verifying the following equation:

$F_{equi} = \text{pade}(T,2) * B(s)$ in which:
pade(T,2) is a second order Pade filter; and
B(s) is a second order Butterworth filter,
$u_c$ is the control value;
u is the non-filtered and non-delayed controlled variable;
s is the Laplace variable; and
$K_{uc}$, $K_u$, $K_{udot}$ and $K_{ui}$ are gains; and
at least one control step during a flight of the aircraft, comprising
entering into the computation unit said current control value generated by means of a data generation unit and computing the inputs for controlling said aircraft relative to said given piloting axis by means of said computation unit utilizing this current control value, the inputs computed in this way being transmitted to the actuator of the control surface, wherein the actuator of the control surface receives the transmitted inputs and is actuated as a function of the received inputs.

2. The method according to claim 1, wherein at least some of said gains $K_{uc}$, $K_u$, $K_{udot}$ and $K_{ui}$ are determined from equations present in said generic set of computation modules.

3. The method according to claim 1, wherein said generic set of parameter computation modules is utilized by a plurality of control steps to control the flight of the aircraft relative to at least two of the following three piloting axes of the aircraft:
the pitch axis;
the roll axis; and
the yaw axis.

4. The method according to claim 1, wherein the control step comprises computing an input in the form of a deflection input $\delta q$ of an elevator of the aircraft from a current control value $Nz_c$ corresponding to a load factor Nz that represents a position of a control column that can be actuated by a pilot of the aircraft using the following equation:

$$\delta q = F_{equi} \cdot \left( K_D Nz_c + K_{Nz} Nz + K_q \cdot q + \frac{K_i}{s}(Nz_c - Nz) \right)$$

in which:
$F_{equi}$ is a global filter;
s is the Laplace variable;
$K_{Nz}$, $K_q$ and $K_i$ are gains; and
$K_D$ is a precontrol term.

5. The method according to claim 4, wherein said gains $K_{Nz}$, $K_q$ and $K_i$ and the precontrol term are computed from the following equations:

$$K_{Nz} = \frac{K_u + p_\alpha K_{udot}}{A}$$

$$K_q = \frac{K_{udot}}{m_{\delta q}}$$

$$K_i = \frac{K_{ui}}{A}$$

$$K_D = \tau K_i$$

in which:
$\tau$ is a time constant value;
$m_{\delta q}$ and $p_\alpha$ are parameters obtained from flight mechanics equations;
A is a value dependent on $m_{\delta q}$ and $p_\alpha$; and
$K_{udot}$, $K_u$ and $K_{ui}$ are parameters that are computed from equations implemented in said generic set of computation modules (Mi).

6. The method according to claim 1, wherein the control step comprises computing an input in the form of a deflection input δr of a virtual yaw control surface from a current control value $\beta_c$ corresponding to a sideslip angle β of the aircraft that represents the position of pedals that can be actuated by a pilot of the aircraft, using the following equation:

$$\delta r = F_{equi} \cdot \left( K_{\beta_c} \beta_c + K_\beta \beta + K_{\beta dot} \dot{\beta} + \frac{K_{\beta int}}{s} (\beta_c - \beta) \right)$$

in which:
$F_{equi}$ is a global filter;
s is the Laplace variable;
$K_\beta$, $K_{\beta dot}$ and $K_{\beta int}$ are gains; and
$K_{\beta_r}$ is a precontrol term.

7. The method according to claim 6, wherein said gains $K_\beta$, $K_{\beta dot}$ and $K_{\beta int}$ and the precontrol term $K_{\beta_r}$ are computed from equations implemented in said generic set of computation modules.

8. The method according to claim 1, wherein the control step comprises computing an input in the form of a deflection input δp of a virtual roll control surface from a current control value $p_c$ corresponding to a roll rate p of the aircraft that represents a position of a control column that can be actuated by a pilot of the aircraft, using the following equation:

$$\delta p = F_{equi} \cdot \left( K_{p_c} p_c + K_p p + \frac{K_{pint}}{s} (p_c - p) \right)$$

in which:
$F_{equi}$ is a global filter;
s is the Laplace variable;
$K_p$ and $K_{pint}$ are gains; and
$K_{p_r}$ is a precontrol term.

9. The method according to claim 8, wherein said gains $K_p$ and $K_{pint}$ and the precontrol term $K_{p_r}$ are computed from a set of equations implemented in said generic set of computation modules.

10. An aircraft electrical flight control system configured to control the flight of the aircraft relative to at least one piloting axis, said system comprising:
a processing unit comprising a generic set of parameter computation modules, at least some of said computation modules being intended to be used for computation of gains of at least one piloting law relative to at least one given piloting axis of the aircraft, said generic set of computation modules utilizing first values illustrating aerodynamic coefficients of the aircraft and second values defining delay and filter characteristics of a control chain relative to the given piloting axis;
at least one data capture unit configured to capture in at least one computation unit associated with a given piloting axis of the aircraft first values illustrating the aerodynamic coefficients of the aircraft and second values defining the delay and filter characteristics of the control chain relative to said piloting axis, the control chain being linearized and satisfying the following equation:

$$\delta_u = F_{equi} \cdot \left( K_{uc} u_c + K_u u + K_{udot} s \cdot u + \frac{K_{ui}}{s} (u_c - u) \right)$$

in which:
$\delta_u$ is the movement of a control surface generated by this control chain;
$F_{equi}$ is a global filter illustrating the modelling of a filter and of the set of delays and asynchronisms of the control chain and satisfying the following equation:
$F_{equi} = \text{pade}(T,2) * B(s)$ in which:
pade(T,2) is a second order Pade filter; and
B(s) is a second order Butterworth filter,
$u_c$ is the control value;
u is the non-filtered and non-delayed controlled variable;
s is the Laplace variable; and
$K_{uc}$, $K_u$, $K_{udot}$ and $K_{ui}$ are gains;
at least one data entry link configured to enter at least one current control value into said computation unit during a flight of the aircraft; and
said at least one computation unit that is configured to compute the gains of the piloting law utilizing at least a part of said generic set of computation modules, said computation unit being configured to compute inputs intended for at least one actuator of a control surface adapted to control the aircraft relative to said piloting axis in accordance with said current control value of the aircraft using a controlled variable supplied in a raw state, the inputs computed in this way being transmitted to the actuator of the control surface, wherein the actuator of the control surface receives the transmitted inputs and is actuated as a function of the received inputs.

11. The system according to claim 10, further comprising:
a computation unit associated with the pitch axis;
a computation unit associated with the roll axis; and
a computation unit associated with the yaw axis.

12. The system according to claim 10, further comprising:
at least one control member that can be actuated configured to generate a control value; and
at least one actuator of a control surface configured to actuate the control surface as a function of inputs received.

13. An aircraft comprising a flight control system according to claim 10.

* * * * *